United States Patent
Iijima

(10) Patent No.: US 10,613,509 B2
(45) Date of Patent: Apr. 7, 2020

(54) CONTROLLER FOR A DRIVE MECHANISM DRIVEN BY A PLURALITY OF MOTORS

(71) Applicant: FANUC CORPORATION, Minamitsuru-gun, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/128,062

(22) Filed: Sep. 11, 2018

(65) Prior Publication Data

US 2019/0113903 A1 Apr. 18, 2019

(30) Foreign Application Priority Data

Oct. 18, 2017 (JP) .................................. 2017-201645

(51) Int. Cl.
| | |
|---|---|
| *G05B 11/36* | (2006.01) |
| *G05B 19/19* | (2006.01) |
| *G05B 11/42* | (2006.01) |
| *G05B 13/02* | (2006.01) |

(52) U.S. Cl.
CPC .............. *G05B 19/19* (2013.01); *G05B 11/42* (2013.01); *G05B 13/021* (2013.01); *G05B 2219/41264* (2013.01); *G05B 2219/43006* (2013.01)

(58) Field of Classification Search
CPC ...... G05B 11/42; G05B 13/021; G05B 19/19; G05B 2219/41264; G05B 2219/43006
See application file for complete search history.

(56) References Cited

U.S. PATENT DOCUMENTS

| | | | |
|---|---|---|---|
| 2010/0181955 A1* | 7/2010 | Maeda ................ | G05B 19/404 318/625 |
| 2014/0306644 A1* | 10/2014 | Sakai .................. | G05B 19/404 318/625 |

FOREIGN PATENT DOCUMENTS

| | | |
|---|---|---|
| JP | 2003-189657 | 7/2003 |
| JP | 2005-099981 | 4/2005 |
| JP | 2006-304442 | 11/2006 |
| JP | 2009-83074 | 4/2009 |
| JP | 2015-23708 | 2/2015 |

OTHER PUBLICATIONS

Notification of Reasons for Refusal dated Jul. 23, 2019 in JP Patent Application No. 2017-201645.

* cited by examiner

*Primary Examiner* — Muhammad S Islam
(74) *Attorney, Agent, or Firm* — Wenderoth, Lind & Ponack, L.L.P.

(57) ABSTRACT

A controller of the present invention for a drive mechanism which is driven by a plurality of motors includes a position command calculation unit and a torque command calculation unit, the position command calculation unit delivers a common position command value to each of the motors and the torque command calculation unit switches, according to the operation state of the drive mechanism, between individualization control for individually performing the output of an integral element of the torque command calculation unit to each of the motors and sharing control for sharing the output of the integral element of the torque command calculation unit to the motors.

3 Claims, 6 Drawing Sheets

CONTROLLER FOR A DRIVE MECHANISM DRIVEN BY A PLURALITY OF MOTORS

This application is based on and claims the benefit of priority from Japanese Patent Application No. 2017-201645, filed on 18 Oct. 2017, the content of which is incorporated herein by reference.

BACKGROUND OF THE INVENTION

Field of the Invention

The present invention relates to a controller for a drive mechanism which is driven by a plurality of motors.

Related Art

Patent Documents 1 to 3 disclose a technology in which conventionally, in a controller for controlling a tandem mechanism that drives a drive mechanism such as a robot or a machine tool with a plurality of motors, as integrator is used in order to avoid interference between the motors (servo motors).

Patent Document 1 discloses a configuration in which, in a motor controller performing tandem control for driving one driven member with a plurality of motors, a position control unit, a speed control unit, a current control unit, a current amplifier, a speed detector and a speed integrator common means for sharing the integral value of as integral element in the speed control unit are included for each of the motors, in which the same position command is input to the control system of the motors performing the tandem control and in which substantially the same integral value of the integral element in the speed control unit is held by the speed integrator common means.

Patent Document 2 discloses a machine tool controller which includes a non-interference compensator for reducing mutual interference of a pair of servo motors, in which the non-interference compensator includes: a torsional rigidity estimation block which estimates the torsional rigidity of a workpiece based on a difference value of position feedback values individually detected from the pair of servo motors and a torque command value for a torsional rigidity measurement that is fed to the pair of servo motors so as to produce torsion on the workpiece; and a torque command value compensation block which estimates a torque command compensation value for compensating for the torque command value for the pair of servo motors based on a difference value of speed feedback values individually detected from the pair of servo motors and the torsional rigidity estimated by the torsional rigidity estimation block.

Patent Document 3 discloses a motor controller for controlling two motors as follows. A first speed control unit includes an integrator which calculates an integral value of a speed error between a speed command value and a rotation speed, and calculates a torque command value based on the speed error, a previously determined value, a proportional gain and an integral gain. A second speed control unit includes an integrator which calculates an integral value of a speed error between a speed command value and a rotation speed, and calculates a torque command value based on the speed error, a previously determined value, a proportional gain and an integral gain. An integral value selection unit selects, according to a driven state of a main motor and a driven state of a sub-motor, any one of the integral values as a previously determined value.

Patent Document 1: Japanese Unexamined Patent Application, Publication No. 2003-189657
Patent Document 2: Japanese Unexamined Patent Application, Publication No. 2009-83074
Patent Document 3: Japanese Unexamined Patent Application, Publication No. 2015-23708

SUMMARY OF THE INVENTION

In a tandem mechanism, a plurality of motors are connected to a common drive mechanism. Connection portions between the individual motors and the drive mechanism may have different mechanical properties because they are the same in terms of design but for example, the assembly and the position of a center of gravity are different. In a transient response (positioning or immediately after application of a disturbance), a remarkable difference between the motors is easily produced.

In Patent Document 1, an integrator in the speed control unit is shared, and although in the sharing, a time constant circuit is used so as to stabilize the transition of the sharing, since it is considered that integral values need to be constantly common, there is room for improvement in that a difference in mechanical properties between tandems is actively absorbed. In this respect, in Patent Document 2, although a difference in transmission properties (torsional rigidity) is attempted to be removed not by an integrator but by gain scheduling and adaptive control, since a mechanism which is little affected by backlash caused by a decelerator is assumed, it cannot be said that mechanical properties are directly absorbed. In Patent Document 3, although integration is surely shared at a certain time, and it is rational to change the sharing of an integrator by an acceleration serving as an inertia force, in the first place, in a transient state such as an acceleration operation, the sharing of integration itself may lead to a decrease in controllability.

An object of the present invention is to provide a controller which absorbs, in the control of a drive mechanism driven by a plurality of motors, mechanical properties between the drive mechanism and the individual motors so as to realize both the acquisition of stability of a steady state and a response improvement in a transient state.

(1) The present invention relates to a controller (for example, a controller 1 which will be described later) for a drive mechanism (for example, a drive mechanism 2 which will be described later) which is driven by a plurality of motors (for example, motors 13 and 23 which will be described later) and includes, according to the motors: a position command calculation unit (for example, a position command calculation unit 10 which will be described later) which calculates a position command value for driving the drive mechanism; a position detection unit (for example, a position detection unit 14, 24 which will be described later) which detects the position of the motor; a speed command calculation unit (for example, a speed command calculation unit 11, 21 which will be described later) which calculates a speed command value based on a position error value determined from the position command value calculated by the position command calculation unit and a position detection value detected by the position detection unit; a speed detection unit (for example, a speed detection unit 15, 25 which will be described later) which calculates a speed detection value from the position detection value detected by the position detection unit; and a torque command calculation unit (for example, a torque command calculation unit 12, 22 which will be described later) which calculates a torque command value from a speed error value determined from the speed command value calculated by the speed command calculation unit and the speed detection value detected by the speed detection unit by use of at least an integral element, where the position command calculation unit delivers the common position command value to each of the motors, and the torque command calculation unit switches, according to the operation state of the drive mechanism, between individualization control for individually performing the output of the integral element of the torque command calculation unit to each of the motors and sharing control for sharing the output of the integral element of the torque command calculation unit to the motors.

(2) Preferably, in the controller described in (1), when the operation state is determined to be a transient state, the individualization control is performed whereas when the operation state is determined to be a steady state, the sharing control is performed.

(3) Preferably, in the controller described in (2), when the position command calculation unit feeds the position command value which is specified as an abrupt acceleration/deceleration operation, the operation state is determined to be the transient state such that the individualization control is performed.

(4) Preferably, in the controller described in (2) or (3), when the position command calculation unit feeds the position command value which is specified as a stop or constant speed operation, the operation state is determined to be the steady state such that the sharing control is performed.

According to the controller of the present invention, it is possible to absorb, in the control of a drive mechanism driven by a plurality of motors, mechanical properties between the drive mechanism and the individual motors so as to realize both the acquisition of stability of a steady state and a response improvement in a transient state.

DETAILED DESCRIPTION OF THE INVENTION

A preferred embodiment of the present invention will be described below with reference to drawings.

Figure 1:
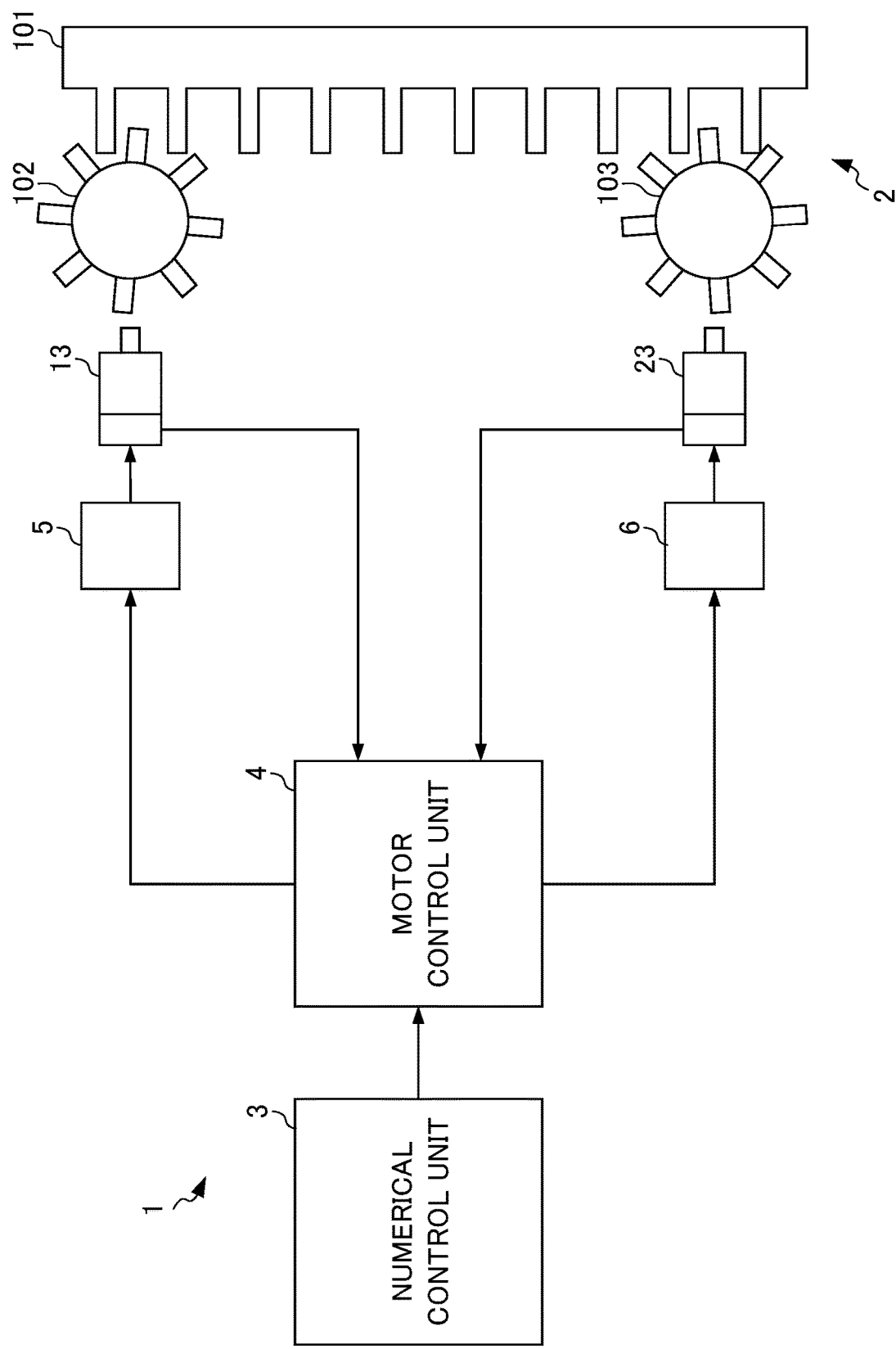
FIG. 1 is a schematic view showing a configuration for performing tandem control in a controller according to an embodiment of the present invention.

A device configuration in which a controller 1 of the present embodiment is used will first be described. FIG. 1 is a schematic view showing a configuration for performing tandem control in the controller 1 according to the embodiment of the present invention. The device configuration with reference to FIG. 1 is an example, and the device configuration to be applied to the controller 1 is not limited to the example shown in FIG. 1.

The controller 1 is intended for performing tandem control in which one drive mechanism 2 is driven by a plurality of (two) motors 13 and 23. The drive mechanism 2 is a robot, a machine tool or the like which is formed with a mobile member 101 and mechanical parts 102 and 103 such as ears. A drive force is transmitted from the motor 13 through the mechanical part 102 to the mobile member 101, and a drive force is transmitted from the motor 23 through the mechanical part 103 thereto.

The controller 1 of the present embodiment includes a numerical control unit 3 and a motor control unit 4. The numerical control unit 3 is a CNC (Computerized Numerical Control), and performs various types of processing for operating the drive mechanism 2. Based on a command from a numerical controller 20, the motor control unit 4 performs current control on the motor 13 through an amplifier 5, and performs current control on the motor 23 through an amplifier 6. The motors 13 and 23 are servo motors, and the motor control unit 4 receives feedback signals for acquiring a position and a speed from each of the motors 13 and 23.

Figure 2:
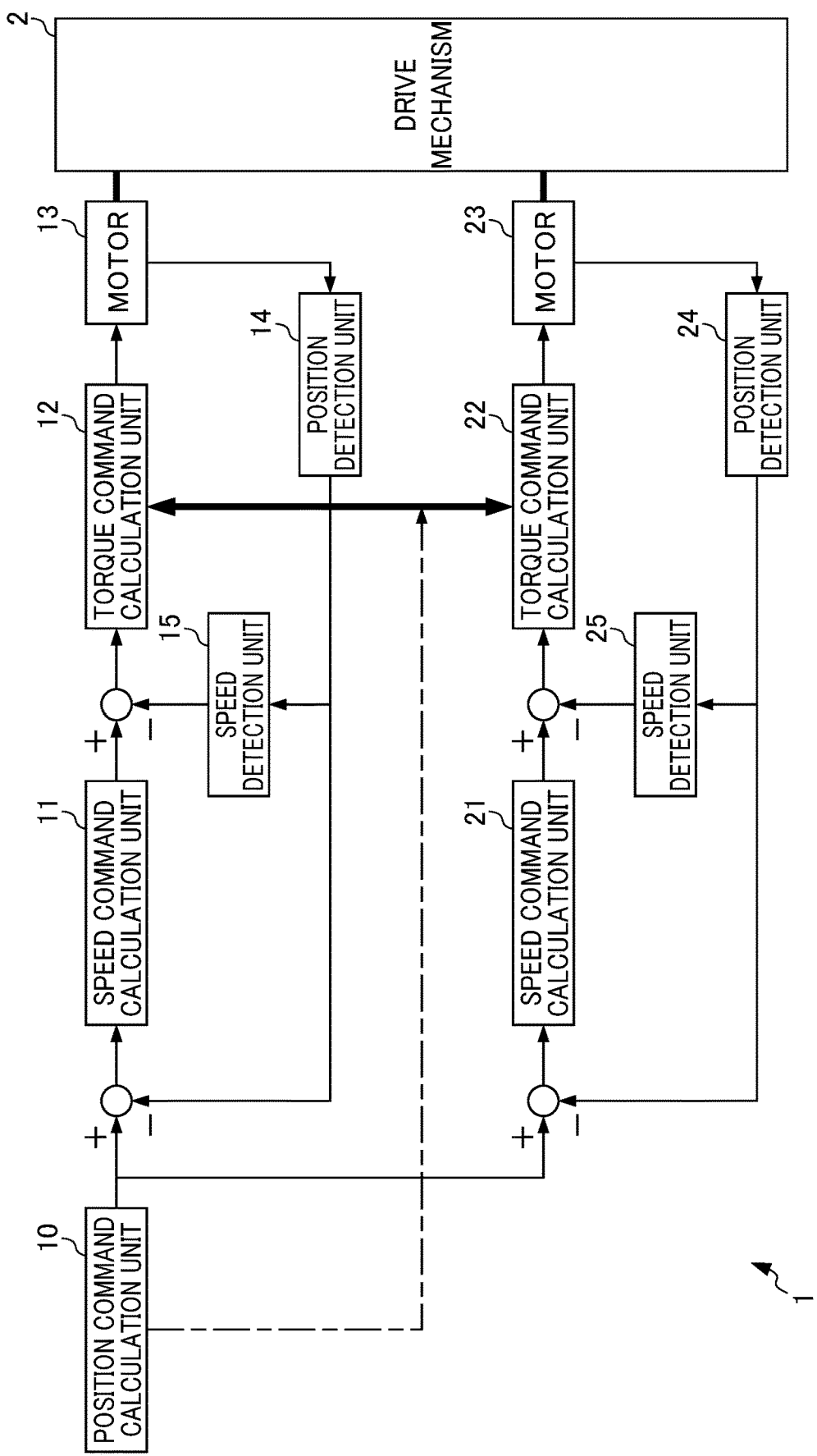
FIG. 2 is a block diagram on the tandem control in the controller of the present embodiment.

FIG. 2 is a block diagram on the tandem control in the controller 1 of the present embodiment. As shown in FIG. 2, the controller 1 includes a position command calculation unit 10, position detection units 14 and 24, speed detection units 15 and 25, speed command calculation units 11 and 21 and torque command calculation units 12 and 22.

The position command calculation unit 10, the position detection units 14 and 24, the speed detection units 15 and 25, the speed command calculation units 11 and 21 and the torque command calculation units 12 and 22 are realized by hardware such as the numerical control unit 3, the motor control unit 4 and the motors 13 and 23. The configurations of these individual units in the controller 1 are not limited to any one of the numerical control unit 3 and the motor control unit 4, and the functions of the individual units may be achieved by cooperation of the numerical control unit 3 and the motor control unit 4 or the functions of the individual units may be achieved by an external device connected through a network.

The position command calculation unit 10 calculates, based on a predetermined program, a position command value for moving the mobile member 101 of the drive mechanism 2 to a predetermined position.

The position detection unit 14 detects the position (rotation angle) of the motor 13, and the position detection unit 24 detects the position (rotation angle) of the motor 23. The position detection units 14 and 24 of the present embodiment are individually formed with encoders for the motors 13 and 23.

The speed detection unit 15 detects, based on a position detection value detected by the position detection unit 14, a speed detection value corresponding to the motor 13, and the speed detection unit 25 detects, based on a position detection value detected by the position detection unit 24, a speed detection value corresponding to the motor 23.

The speed command calculation unit 11 calculates, based on the position command value input from the position command calculation unit 10 and the position detection value detected by the position detection unit 14, a speed command value, and the speed command calculation unit 21 calculates, based on the position command value input from the position command calculation unit 10 and the position detection value detected by the position detection unit 24, a speed command value. The speed command value is calculated by P control with consideration given to a proportional element. The speed command value may be calculated such as by PID control with consideration given to a proportional element, an integral element and a derivative element; and, as a method of calculating the speed command value, an appropriate method can be selected according to circumstances.

The torque command calculation unit 12 calculates the torque command value for the motor 13 based on the speed command value calculated by the speed command calculation unit 11 and the speed detection value detected by the speed detection unit 15. The torque command calculation unit 22 calculates the torque command value for the motor 23 based on the speed command value calculated by the speed command calculation unit 11 or the speed command value calculated by the speed command calculation unit 21 and the speed detection value detected by the speed detection unit 25. The torque command value is calculated by the PID control with consideration given to the proportional element, the integral element and the derivative element or the PI control with consideration given to the proportional element and the integral element. The torque command value is preferably calculated by control including at least the integral element so that a steady error is set to zero in an internal model principle.

In the present embodiment, the sharing and individualization of the integrators in the torque command calculation units 12 and 22 corresponding to the motors 13 and 23 are selectively performed based on an operation pattern and the transition thereof. Here, selective control in the present embodiment will be described using a conventional technology as a comparative example.

Figure 3:
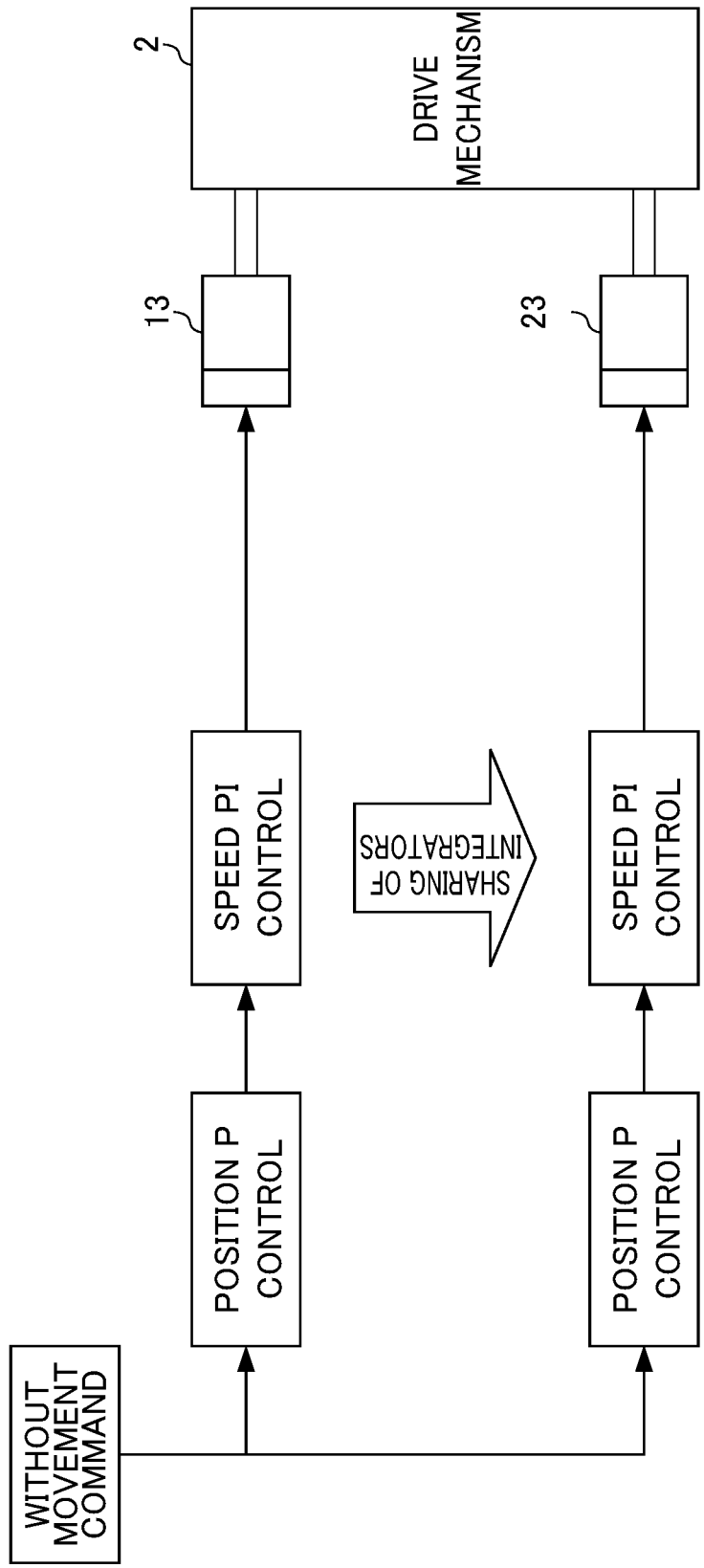
FIG. 3 is a schematic view showing an example where an integrator in a comparative example is shared such that individual motors are controlled.

FIG. 3 is a schematic view showing an example where an integrator in the comparative example is shared such that individual motors are controlled. In a state shown in FIG. 3, the example is shown where a movement command for moving the mobile member 101 of the drive mechanism 2 is not present, where position P control using the proportional element is performed and where speed PI control using the proportional element and the integral element is performed. In a state where the motors 13 and 23 are stationary without the movement command, when a long time elapses, by feedback fluctuations, the state is brought into a state where both of them (the motors 13 and 23) repel each other by the integral element of the speed PI control. In the comparative example, the integrator used in the speed PI control corresponding to the motor 13 and the integrator used in the speed PI control corresponding to the motor 23 are shared, and thus the repulsion of both of them is avoided, with the result that stability is maintained. However, in a transient state which is easily affected by a difference in the mechanical properties of the motors 13 and 23, the accuracy of the control may be impaired by the sharing of the integrators.

Figure 4:
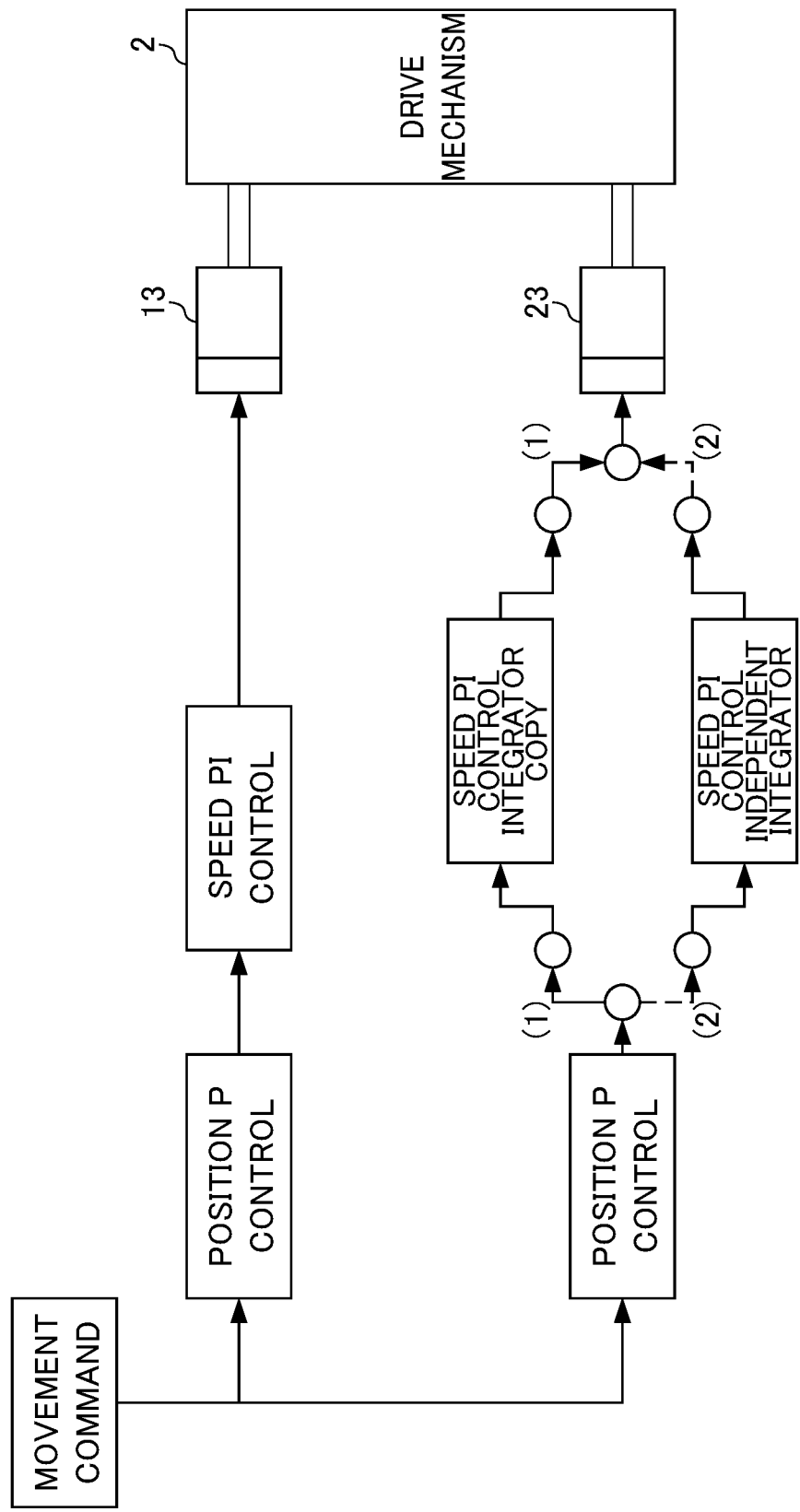
FIG. 4 is a schematic view showing control for selecting a case where integrators in the controller of the present embodiment are shared or a case where they are individualized.

Hence, in the present embodiment, processing is performed for selecting the sharing or individualization of the integrators according to whether the state is the transient state or the steady state. FIG. 4 is a schematic view showing control for selecting a case where the integrators in the controller 1 of the present embodiment are shared or a case where they are individualized. As shown in FIG. 4, the controller 1 performs the processing for switching between the sharing and the individualization of the integrators according to an operation state.

When the operation state of the drive mechanism 2 is the steady state, a path (1) indicated by a solid line in FIG. 4 is selected, and an integrator (copy) common to the integrator in the torque command calculation unit 12 corresponding to the motor 13 is used so as to calculate the torque command value for the motor 23. The steady state here refers to, for example, a state where the drive mechanism 2 is operated at a constant speed in a stop state or in a state where a disturbance is not produced.

When the operation state of the drive mechanism 2 is the transient state, a path (2) indicated by a broken line in FIG. 4 is selected, and an integrator in the torque command calculation unit 22 corresponding to the motor 23 is used, and thus a torque command value for the motor 23 is individually calculated. The transient state here refers to a state where an abrupt operation, such as positioning, immediately after application of a disturbance or an acceleration/deceleration operation, which is easily affected by the mechanical properties between the motors 13 and 23, is performed. For example, a case where a predetermined acceleration, a predetermined speed range, a predetermined load, a predetermined torque or the like is exceeded may be set as the transient state. Alternatively, the CNC program of the numerical control unit 3 is decoded, and based on the result thereof, the steady state, the transient state, the other state or the like may be determined.

Figure 5:
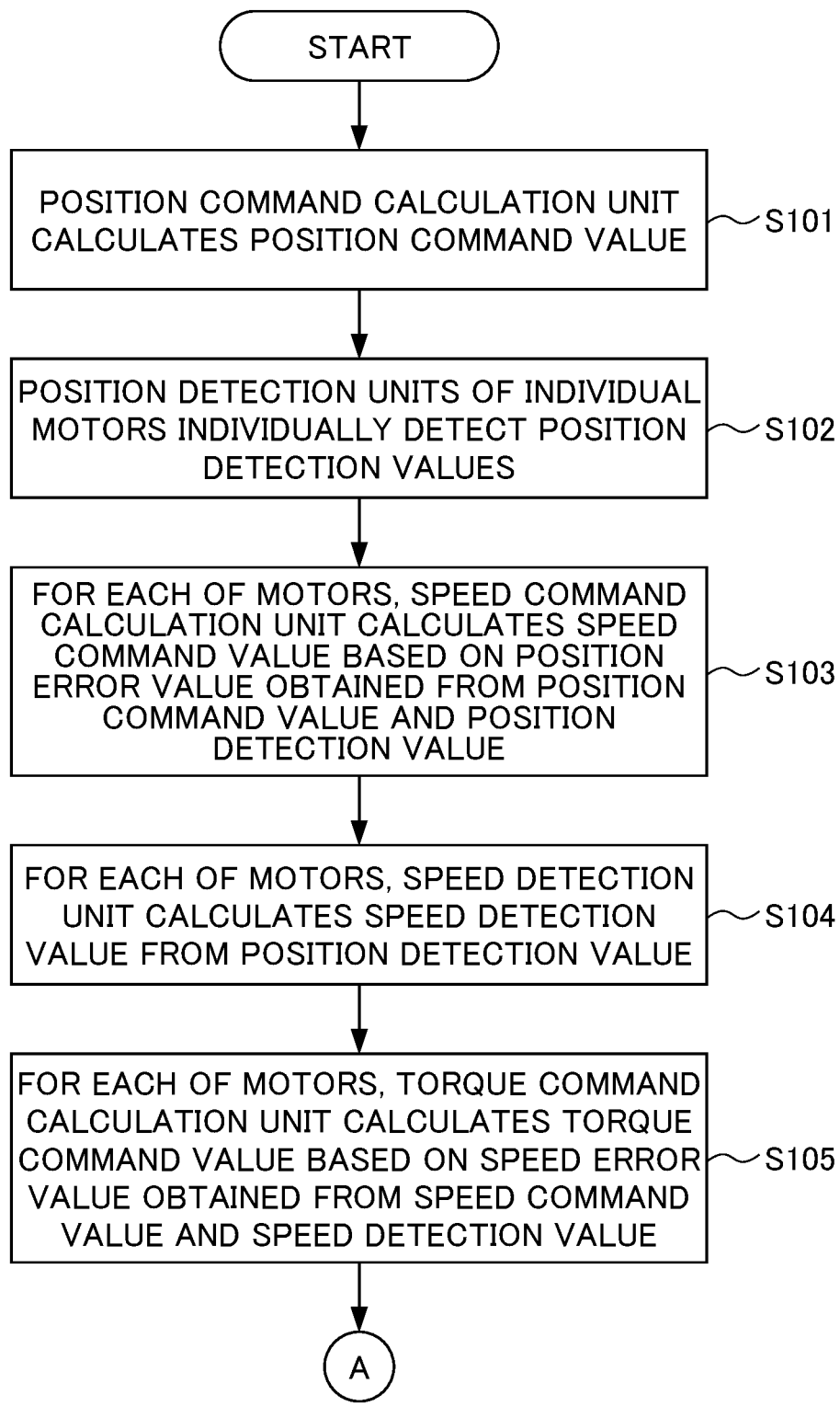
FIG. 5 is a flowchart showing a first half of the overall flow of control on a drive mechanism performed by the controller of the present embodiment.

The specific flow of the processing for individualizing or sharing the integrators performed by the controller 1 of the present embodiment will next be described. The flow of a first half until the torque command values for the motors 13 and 23 are calculated will first be described with reference to FIG. 5. FIG. 5 is a flowchart showing the first half of the overall flow of control on the drive mechanism 2 performed by the controller 1 of the present embodiment.

The position command calculation unit 10 calculates the position command value (step S101). The position detection unit 14 detects the position detection value of the motor 13, and the position detection unit 24 detects the position detection value of the motor 23 (step S102).

In the motor 13, the speed command calculation unit 11 calculates the speed command value based on a position error value obtained from the position command value and the position detection value, and in the motor 23, the speed command calculation unit 21 calculates the speed command value based on a position error value obtained from the position command value and the position detection value (step S103).

The speed detection unit 15 calculates the speed detection value of the motor 13 from the position detection value of the position detection unit 14, and the speed detection unit 25 calculates the speed detection value of the motor 23 from the position detection value of the position detection unit 24 (step S104).

On the side of the motor 13, the torque command calculation unit 12 calculates the torque command value based on a speed error value obtained from the speed command value of the speed command calculation unit 11 and the speed detection value of the speed detection unit 15, and on the side of the motor 23, the torque command calculation unit 22 calculates the torque command value based on a speed error value obtained from the speed command value of the speed command calculation unit 21 and the speed detection value of the speed detection unit 25 (step S105).

Figure 6:
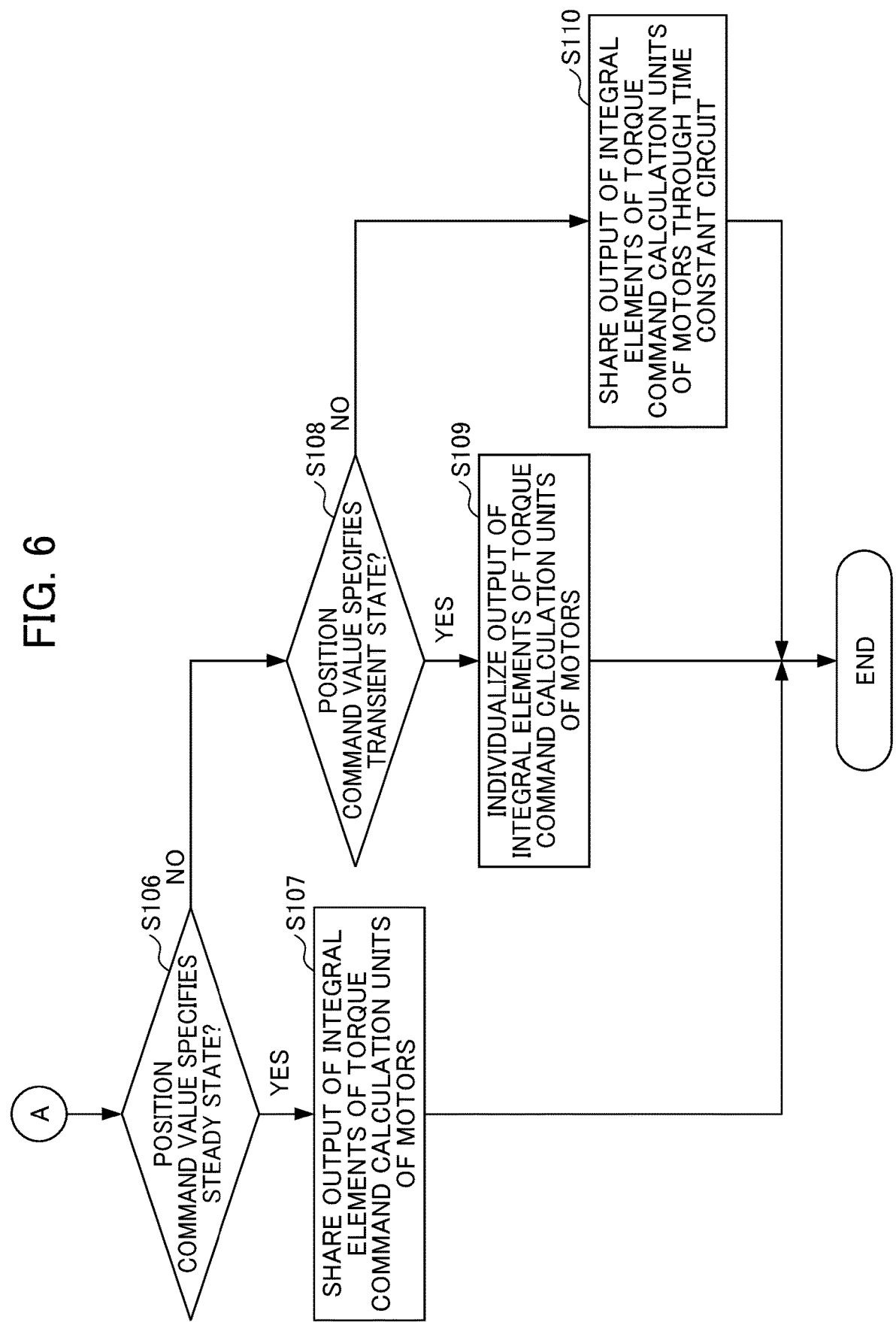
FIG. 6 is a flowchart showing a second half of the overall flow of the control on the drive mechanism performed by the controller of the present embodiment.

The flow of a second half after the torque command values for the motors 13 and 23 are calculated will next be described with reference to FIG. 6. FIG. 6 is a flowchart showing the second half of the overall flow of the control on the drive mechanism 2 performed by the controller 1 of the present embodiment.

The controller 1 determines whether or not the position command value specifies the steady state (step S106). As described previously, the steady state refers to the stop state or the state where the drive mechanism 2 is operated at a constant speed, and based on the position command value and the conditions of the operation, the controller 1 determines whether or not the state is the steady state. When the steady state is commanded in the determination of step S107, processing for sharing the output of the integral element of the torque command calculation units 12 and 22 in the motors 13 and 23 is performed (step S107).

When the steady state is not commanded in step S107, determination is made as to whether or not the position command value is in the transient state (step S108). As described previously, the transient state refers to the state where the drive mechanism 2 is operated by an abrupt operation such as an acceleration/deceleration operation, that is, a state where at least the steady state is not specified. The controller 1 determines, based on the position command value and the conditions of the operation, whether or not the state is the transient state.

When in the determination of step S108, the position command value is in the transient state, the output of the integral elements of the torque command calculation units 12 and 22 is individualized such that the motor 13 is controlled by the torque command value calculated in the torque command calculation unit 12 and that the motor 23 is controlled by the torque command value calculated in the torque command calculation unit 22 (step S109).

When in step S108, the position command value is not in the transient state, through a time constant circuit, the output of the integral elements of the torque command calculation units 12 and 22 of the motors 13 and 23 is shared (step S109). When the position command value which specifies a transition state between the transient state and the steady state is fed to the position command calculation unit 10, sharing is performed between the motors 13 and 23 over a given period of time while the output of the integral element of the torque command calculation unit 12 is delayed with the time constant circuit. A multiplication by an appropriate time constant is performed such that the amount of control is prevented from being discontinuous.

In the embodiment described above, the following effects are achieved. Specifically, the controller 1 includes, according to the individual motors 13 and 23: the position command calculation unit 10 which calculates the position command value for driving the drive mechanism 2; the position detection units 14 and 24 which detect the positions of the motors 13 and 23; the speed command calculation units 11 and 21 which calculate the speed command value based on the position error value determined from the position command value calculated by the position command calculation unit 10 and the position detection value detected by the position detection units 14 and 24; the speed detection units 15 and 25 which calculate the speed detection value from the position detection value detected by the position detection units 14 and 24; and the torque command calculation units 12 and 22 which calculate the torque command value from the speed error value determined from the speed command value calculated by the speed command calculation units 11 and 21 and the speed detection value detected by the speed detection units 15 and 25 by use of at least the integral element. The position command calculation unit 10 delivers the common position command value to each of the motors 13 and 23, and the torque command calculation units 12 and 22 switch, according to the operation state of the drive mechanism 2, between individualization control for individually performing the output of the integral elements of the torque command calculation units 12 and 22 to each of the motors 13 and 23 and sharing control for sharing the output of the integral element of the torque command calculation unit 12 to the motors 13 and 23.

In this way, since the method of outputting the integral element can be selected according to the conditions of the operation, in a state where infinite time is problematic, the integrators are shared such that the stability of the control is realized; whereas in a state where a remarkable difference in mechanical properties between the motors 13 and 23 is produced, the integrators are individualized such that a difference in mechanical properties between the motors 13 and 23 is absorbed and that thus it is possible to achieve a response improvement.

In the controller 1 of the present embodiment, when the operation state is determined to be the transient state, the individualization control is performed; whereas when the operation state is determined to be the steady state, the sharing control is performed.

In this way, the form of the speed controller is switched according to whether the operation state is the transient state or the steady state, and thus a configuration is realized in which at the time of a transient response, individual properties are absorbed by individual controllers, whereas at the time of a steady response, the properties of both of them are made uniform by sharing of the integrators.

In the controller 1 of the present embodiment, when the position command calculation unit 10 feeds the position command value which is specified as an abrupt acceleration/deceleration operation, the operation state is determined to be the transient state, and thus the individualization control is performed. In this way, with simple processing, it is possible to accurately determine whether or not the operation state is the transient state.

In the controller 1 of the present embodiment, when the position command calculation unit 10 feeds the position command value which is specified as a stop or constant speed operation, the operation state is determined to be the steady state such that the sharing control is performed. In this way, with simple processing, it is possible to accurately determine whether or not the operation state is the steady state.

Although the preferred embodiment of the present invention is described above, the present invention is not limited to the embodiment described above, and modifications are possible as necessary. For example, although in the embodiment described above, in step S110, the sharing processing is performed through the time constant circuit, there is no limitation to this configuration. In other words, at the time of transition from the transient state to the steady state or transition from the steady state to the transient state, a multiplication by a time constant may be performed or the individualization control and the sharing control may be switched without any multiplication by a time constant.

EXPLANATION OF REFERENCE NUMERALS 1 controller
2 drive mechanism
11, 21 speed command calculation unit
12, 22 torque command calculation unit
13, 23 motor
14, 24 position detection unit
15, 25 speed detection unit

What is claimed is:
1. A controller for a drive mechanism which is driven by a plurality of motors, the controller comprising, according to the motors:

a position command calculation unit which calculates a position command value for driving the drive mechanism;

a position detection unit which detects a position of the motor;

a speed command calculation unit which calculates a speed command value based on a position error value determined from the position command value calculated by the position command calculation unit and a position detection value detected by the position detection unit;

a speed detection unit which calculates a speed detection value from the position detection value detected by the position detection unit; and a torque command calculation unit which calculates a torque command value from a speed error value determined from the speed command value calculated by the speed command calculation unit and the speed detection value detected by the speed detection unit by use of at least an integral element, wherein the position command calculation unit delivers the common position command value to each of the motors, the torque command calculation unit switches, according to an operation state of the drive mechanism, between individualized control so that the output of the integral element of the torque command calculation unit is individualized to each of the plurality of motors and sharing control so that the output of the integral element of the torque command calculation unit is shared between the plurality of motors, and wherein when the position command calculation unit feeds the position command value which is specified as a stop or constant speed operation, the operation state is determined to be a steady state such that the sharing control is performed.

2. The controller according to claim 1, wherein when the operation state is determined to be a transient state, the individualized control is performed; whereas when the operation state is determined to be a steady state, the sharing control is performed.

3. The controller according to claim 2, wherein when the position command calculation unit feeds the position command value which is specified as an abrupt acceleration/deceleration operation, the operation state is determined to be the transient state such that the individualized control is performed.

* * * * *